United States Patent [19]

Piazzola

[11] Patent Number: 4,763,722

[45] Date of Patent: Aug. 16, 1988

[54] MODULAR ELEMENT HEAT EXCHANGER, PARTICULARLY FOR EXTRUSION CYLINDERS, INJECTION MOLDING MACHINES, DRAWING MACHINES AND THE LIKE PLASTICS PROCESSING MACHINES

[76] Inventor: Gaetano Piazzola, Via Borri, 148, 21100 Varese, Italy

[21] Appl. No.: 40,350

[22] Filed: Apr. 20, 1987

[30] Foreign Application Priority Data

Apr. 18, 1986 [IT] Italy ............................... 20144 A/86

[51] Int. Cl.⁴ .............................................. F25B 29/00
[52] U.S. Cl. ....................................... 165/64; 165/122; 165/124; 165/185; 425/144; 425/379.1; 264/40.6
[58] Field of Search ................... 165/61, 64, 122, 124, 165/30, 185; 425/143, 144, 378 R, 379 R; 264/40.6

[56] References Cited

U.S. PATENT DOCUMENTS

| | | | |
|---|---|---|---|
| 2,541,201 | 2/1951 | Buecken et al. | 264/40.6 |
| 2,721,729 | 10/1955 | Van Riper | 165/64 |
| 2,893,055 | 7/1959 | Wenzel | 165/64 |
| 3,167,812 | 2/1965 | Von Bennigsen | 165/30 |
| 3,218,671 | 11/1965 | Justus et al. | 425/144 |
| 3,285,329 | 11/1966 | Finn | 165/61 |
| 3,317,958 | 5/1967 | Stroup et al. | 165/64 |
| 3,353,212 | 11/1967 | Nelson et al. | 165/61 |
| 3,727,678 | 4/1973 | Schott, Jr. | 165/64 |
| 3,730,262 | 5/1973 | Drugmand | 164/64 |
| 3,743,252 | 7/1973 | Schott, Jr. | 165/146 |
| 3,933,200 | 1/1976 | Cunningham | 165/64 |
| 4,072,185 | 2/1978 | Nelson | 165/122 |
| 4,634,361 | 1/1987 | Piazzola | 165/122 |

FOREIGN PATENT DOCUMENTS

| | | | |
|---|---|---|---|
| 1149161 | 5/1963 | Fed. Rep. of Germany | 165/64 |
| 502181 | 3/1971 | Switzerland | 425/378 R |

Primary Examiner—Albert W. Davis, Jr.
Assistant Examiner—John K. Ford
Attorney, Agent, or Firm—Bucknam and Archer

[57] ABSTRACT

The heat exchanger comprises a plurality of semicylindrical segments, coupled so as to substantially define a circular sleeve encompassing the body to be thermally controlled, the segments being axially stacked and provided with radially extending fins including throughgoing holes, in the two opposite lateral faces of the segments there being provided recesses for housing an electric resistance, and an outer casing being moreover provided which defines, cooperating with the segments, an air conveying path which successively extends on the outer and inner surfaces of the segments.

8 Claims, 7 Drawing Sheets

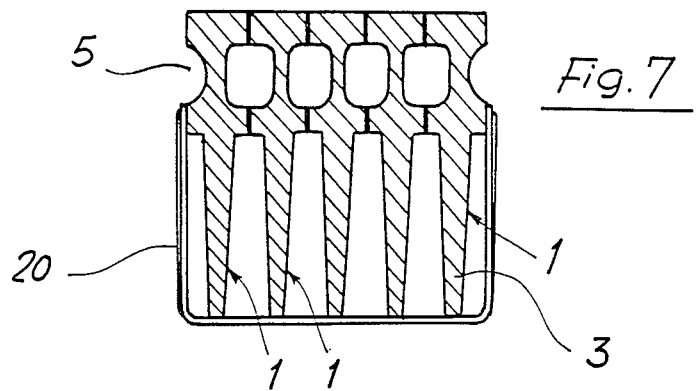
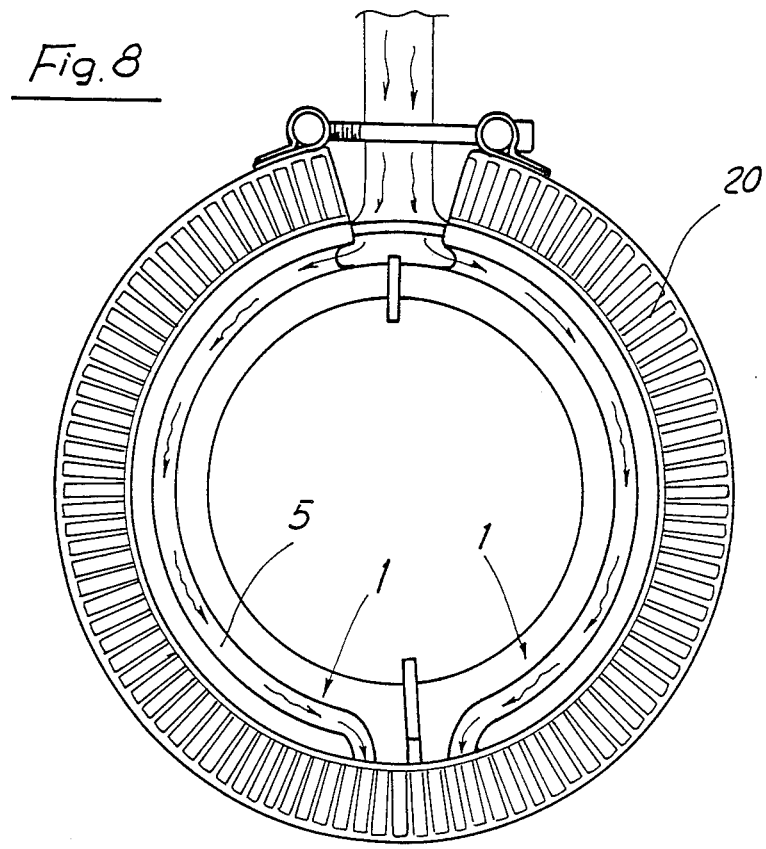

MODULAR ELEMENT HEAT EXCHANGER, PARTICULARLY FOR EXTRUSION CYLINDERS, INJECTION MOLDING MACHINES, DRAWING MACHINES AND THE LIKE PLASTICS PROCESSING MACHINES

BACKGROUND OF THE INVENTION

The present invention relates to a modular element heat exchanger, particularly designed for extrusion cylinders, injection moulding machines, drawings machines and the like plastics material processing machines.

As is known, in many plastics material processing operations there are used apparatus including a screw member rotating inside a cylinder with a small clearance so as to cause the material to advance.

The cylinder must comprise heating elements for plasticizing the material before pushing said material through the forming or molding machine; in this connection it should be apparent that a temperature adjusting or controlling system must be used which system must be very accurate in controlling temperature.

In order to obtain the desired temperature adjustment, in addition to the mentioned heating system, a cooling assembly must be provided for reducing temperature as it exceeds a set value.

The presently adopted solutions are generally very complex and, moreover, they are not always able of quickly tracking the temperature changes, with a consequent rather high waste products.

SUMMARY OF THE INVENTION

The main object of the present invention is to solve the above mentioned problem by providing a modular element heat exchanger, particularly designed for plastics material extrusion cylinders, injection molding machines, drawing machine and the like machines for processing plastics material which afford the possibility of accurately and quickly adjusting the set temperature value thereby providing high quality products.

Another object of the present invention is to provide a heat exchanger which may be easily and quickly applied to the plastics material processing machines, with very simple and quick operations.

Another object of the present invention is to provide a modular element heat exchanger which is operatively very reliable.

Yet another object of the present invention is that of providing a heat exchanger which may be easily made starting from easily available elements and materials and which, moreover, is of reduced cost.

According to one aspect of the present invention, the above mentioned objects, as well as yet other objects, which will become more apparent thereinafter, are achieved by a modular element heat exchanger, particularly designed for plastics material extrusion cylinders, injection molding machines, drawing machines and the like machines for processing plastics materials, characterized in that it comprises a plurality of segments of circular semi-crown shape, which are coupled to one another so as to provide a substantially circular crown which may be fitted about the body to be thermally controlled.

The mentioned segments may be axially stacked and are provided with radially extending fins, including throughgoing holes, the two faces of the segments being formed with recesses for housing an electric resistance.

A holding casing is moreover provided which defines, in cooperation with the segments, an air conveying path which successively extends on the outer surface and inner surface of the segments.

BRIEF DESCRIPTION OF THE DRAWINGS

Further characteristics and advantages of the present invention will become more apparent thereinafter from the following description of a preferred, though not exclusive, embodiment of a modular element heat exchanger, which is illustrated, by way of an indicative example, in the accompanying drawings, where;

FIG. 7 schematically illustrates a cross sectional view of a plurality of segments which are stacked and contained in a holding casing;

FIG. 8 illustrates the segments as held in the holding casing;

DESCRIPTION OF THE PREFERRED EMBODIMENTS

With reference to the mentioned figures, the modular element heat exchanger, particularly designed for plastics material extrusion cylinders, injection molding machines, drawing machines and the like machines for processing plastics material, according to the invention, comprises a plurality of segments, which are generally indicated at 1 and which, advantageously, are substantially shaped as a circular semicrown or sleeve.

The segments are provided with correspondingly arranged throughgoing holes 2 thereinto pins 2a may be introduced for axially stacking the segments.

Figures 5, 6:
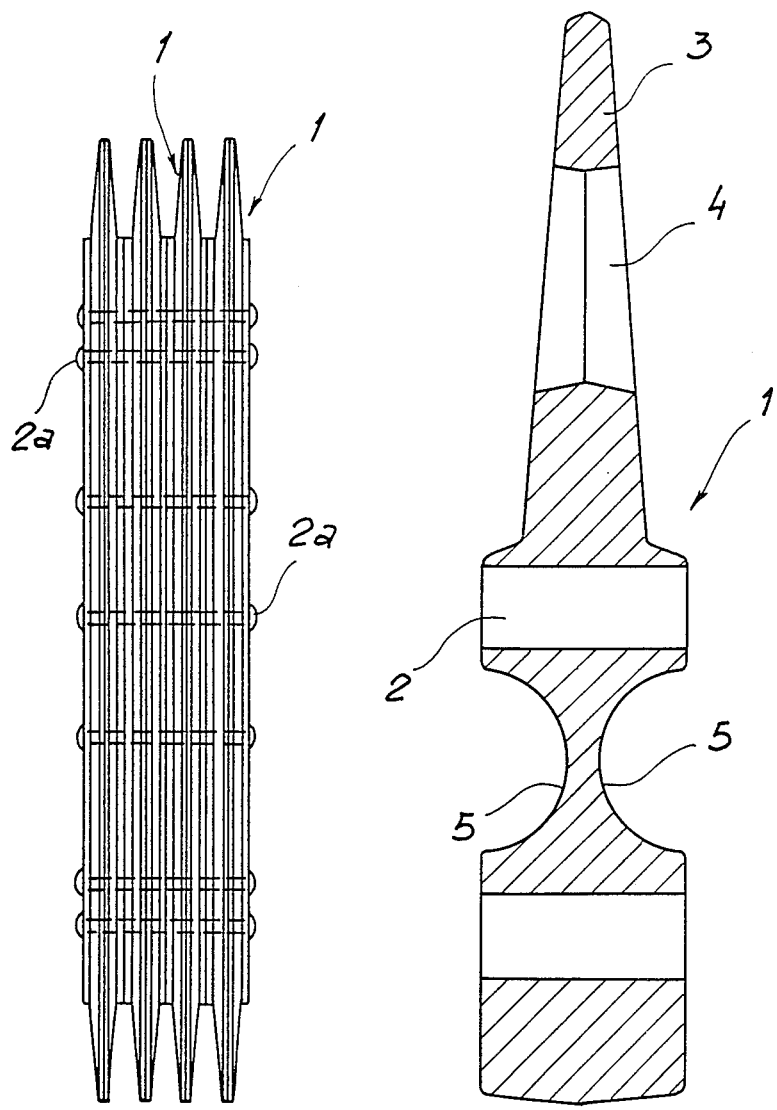
FIG. 5 schematically illustrates a plurality of stacked segments.
FIG. 6 illustrates, on an enlarged scale, a cross sectional view of a segment.

Moreover, the segments 1 are provided, on the periphery thereof, with a fin 3 which is tapered and comprises, on its surface, throughgoing openings 4 (see for example FIGS. 1 and 6) for facilitating air passage therethrough and, accordingly the heat transmission, as will become more apparent thereinafter.

Figure 1:
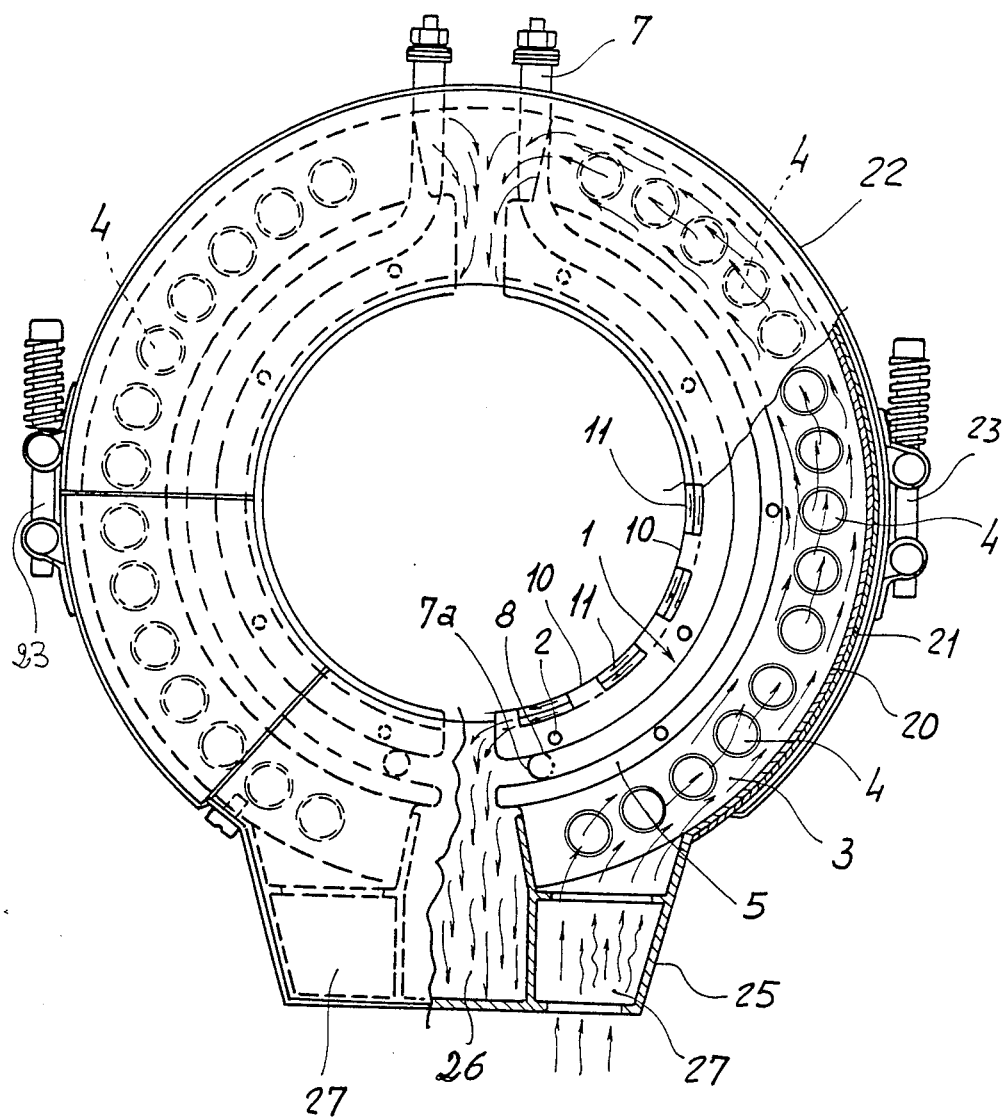
FIG. 1 is a schematic cross-sectional view illustrating the heat exchanger according to the invention.
Figure 2:
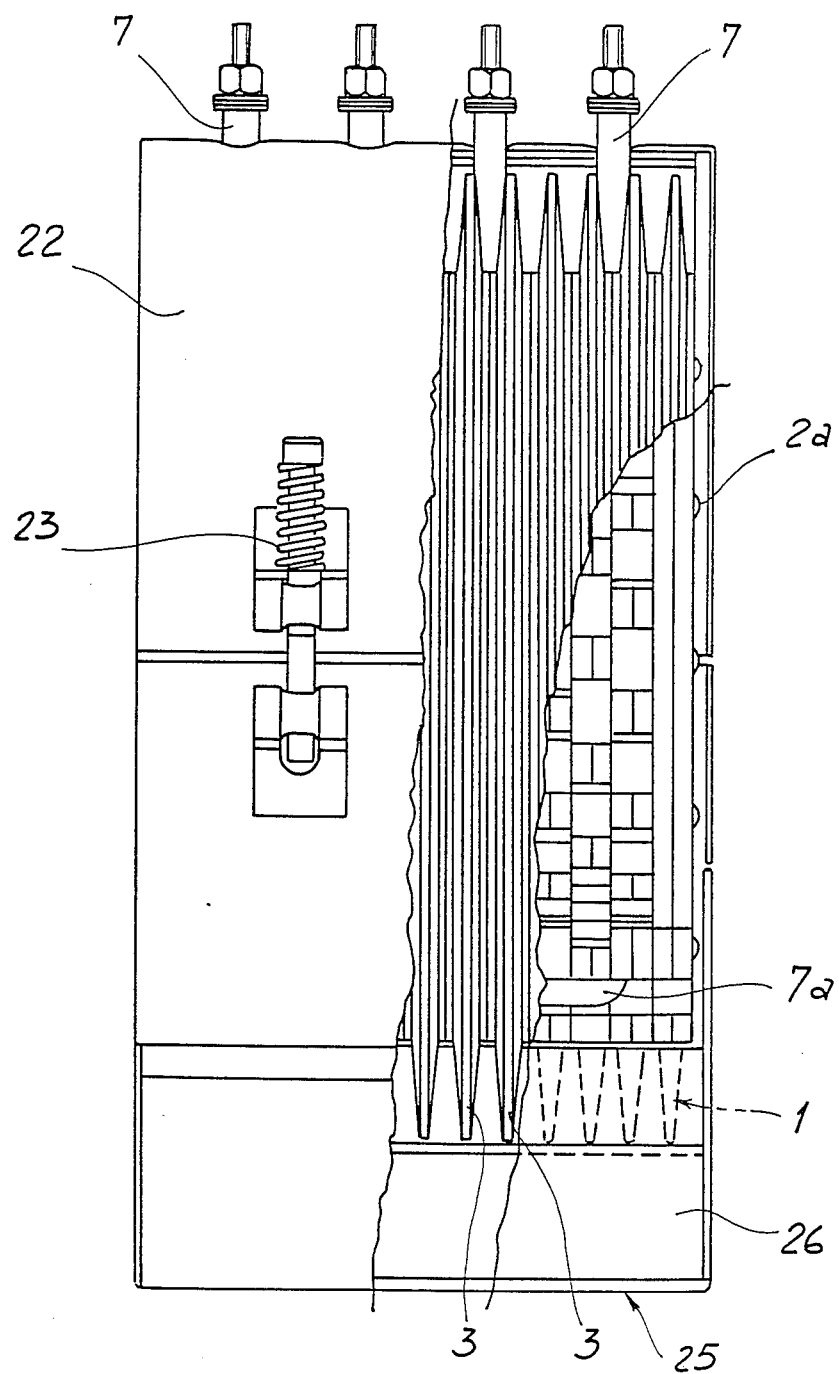
FIG. 2 illustrates the heat exchanger as seen from outside and partially broken away.

At an intermediate portion thereof, the segments 1 are provided, on the two faces, which a recess 5 (FIGS. 1, 4, 6, 7) substantially extending according to a semicircumference and adapted for housing an electric resistance, generally indicated at 7 (FIG. 2).

At one end, the recesses 5 are provided with a recessed slot 8 (FIGS. 1, 4) for housing the axial portion 7a of the electric resistance 7 which, advantageously, substantially extends with a U-shape, with its leg bent as a semicircumference, so as to be housed in the mentioned segments.

Figure 3:
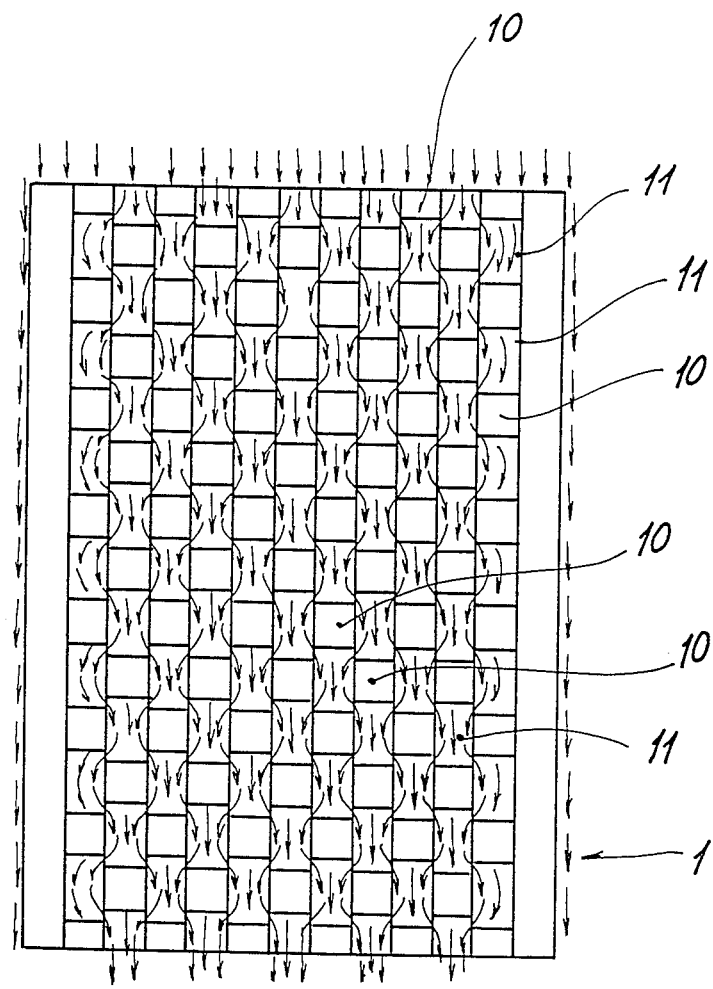
FIG. 3 is an extended view of the inner surface defined by the segments contacting a cylinder to be temperatured adjusted or controlled.

On their inner periphery, the segments define projecting regions 10 (FIG. 3), spaced by recessed regions 11 (FIG. 3) so as to provide regions for contacting the cylinder, which regions consist of the regions 10 and the air or cooling fluid passage regions, which are offset from the regions 10 as is schematically illustrated in FIG. 3.

More specifically, the alternating arrangement of the regions 10 and regions 11 provides an alternating succession of regions 10, for heating by contact the cylinder, and a region for the cooling fluid, thereby affording the possibility of accurately thermally controlling the cylinder thereon the heat exchanger is applied.

During the assembling step, about the cylinder which is to be thermally controlled there are fitted two opposite assemblies of segments 1, which segments are mutually stacked according to the desired axial extension and depending on the coupled segment number.

The two segment assemblies are advantageously coupled by staple or hook members, so as to be held in the proper positions.

Figure 9:
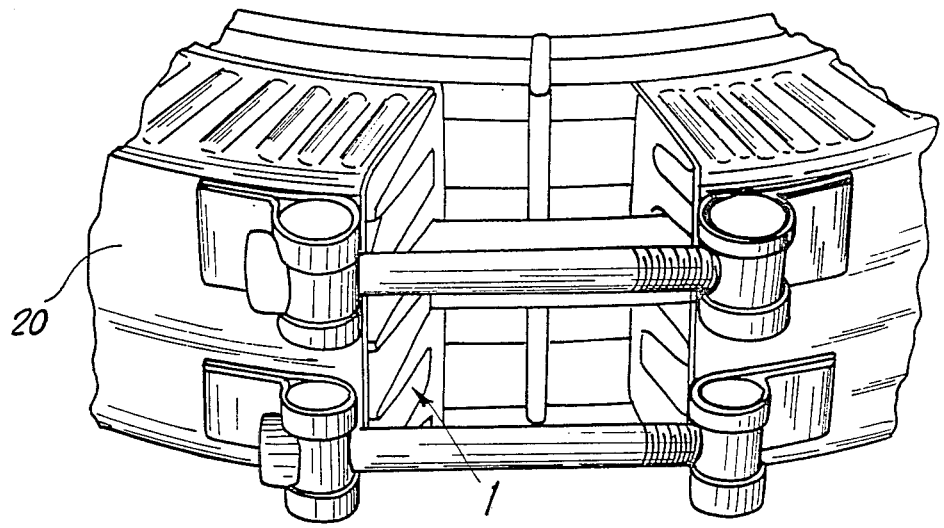
FIG. 9 illustrates a perspective view of a detail of the coupling of the edges of the holding casing.

The above mentioned segments are introduced into a holding casing 20 (FIGS. 1, 8, 9) on the outside of which there is provided a thermally insulating layer 21 (FIG. 1) which is in turn held by an outer band 22 (FIGS. 1), which is made as two semicylinderical bodies coupled by closure hook members, generally indicated at 23 (FIG. 1).

As is shown in FIG. 1 by the arrows, the holding casing 20 defines, in cooperation with the segments, and air path extending successively on the outer periphery and inner periphery of the segments themselves.

The outer band 22 is coupled by a section member 25 which, with said band, provides an outer holding casing.

In addition, the section member 25 is provided with a central channel 26 and side channels 27 (see FIG. 1, 2).

The section member 25 is so designed and arranged that the side channels 27 communicate with the outer surfaces of the segments so as the air, blown from the channel 27, contacts the outside surfaces of the segment, all along the semicircular extension thereof, in order to radially return towards the cylinder inside, at the opposite end, where the air flow moves back through the segments, the resistance region, and through the regions 10 and 11 contacting the cylinder.

During this return step, the air is conveyed towards the central channel 26.

It should be apparent that the air circulation may be reversed, by using the central channel 26 as the supply path and the side channels 27 as the return path.

The section member 25 is closed at one end and, at the other end, defines the supply and output mouth.

Figure 10:
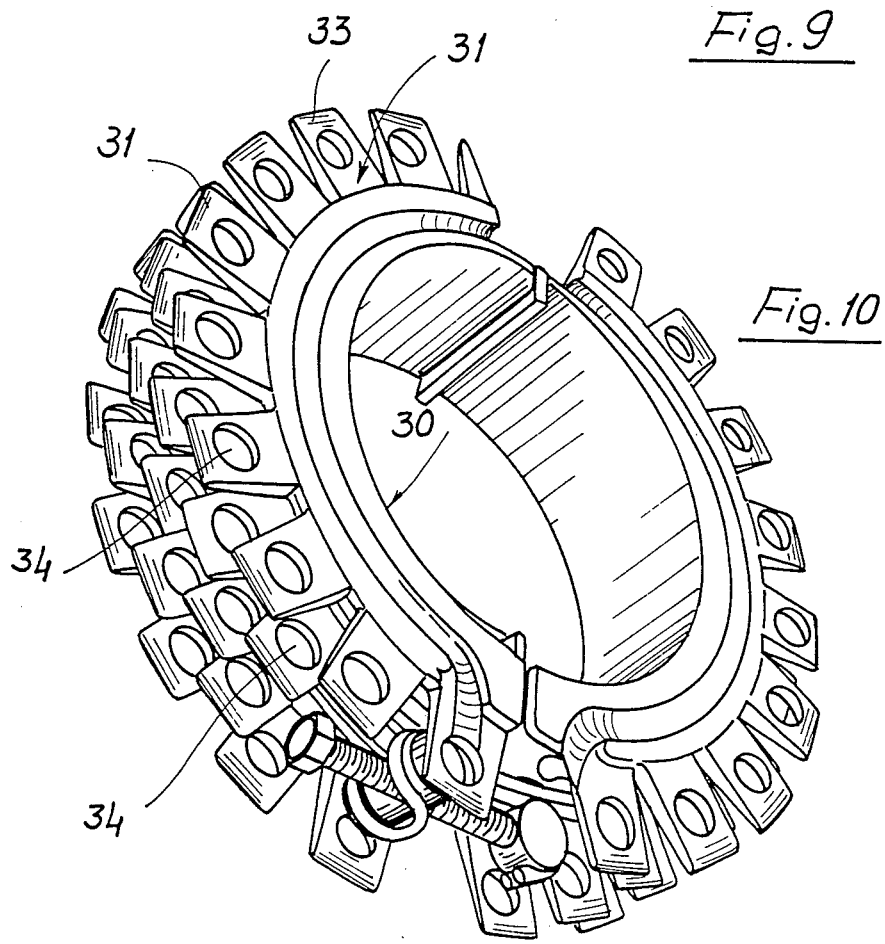
FIG. 10 schematically illustrates a perspective view of another embodiment of the segments.

As shown in FIG. 10, the possibility is further contemplated of making segments, indicated at 30, which are provided with an outer radial fin arrangement 31, with the fin portions 33 provided with a throughgoing opening 34 for facilitating the heat transmission between the air and the thermal mass of the segments.

From the above disclosure it should be apparent that the invention fully achieves the intended objects.

More specifically, a heat exchanger has been provided which consists of modular elements, that is the segments 1, which are coupled so as to obtain the desired size of the heat exchanger depending on the specific requirements.

Figure 4:
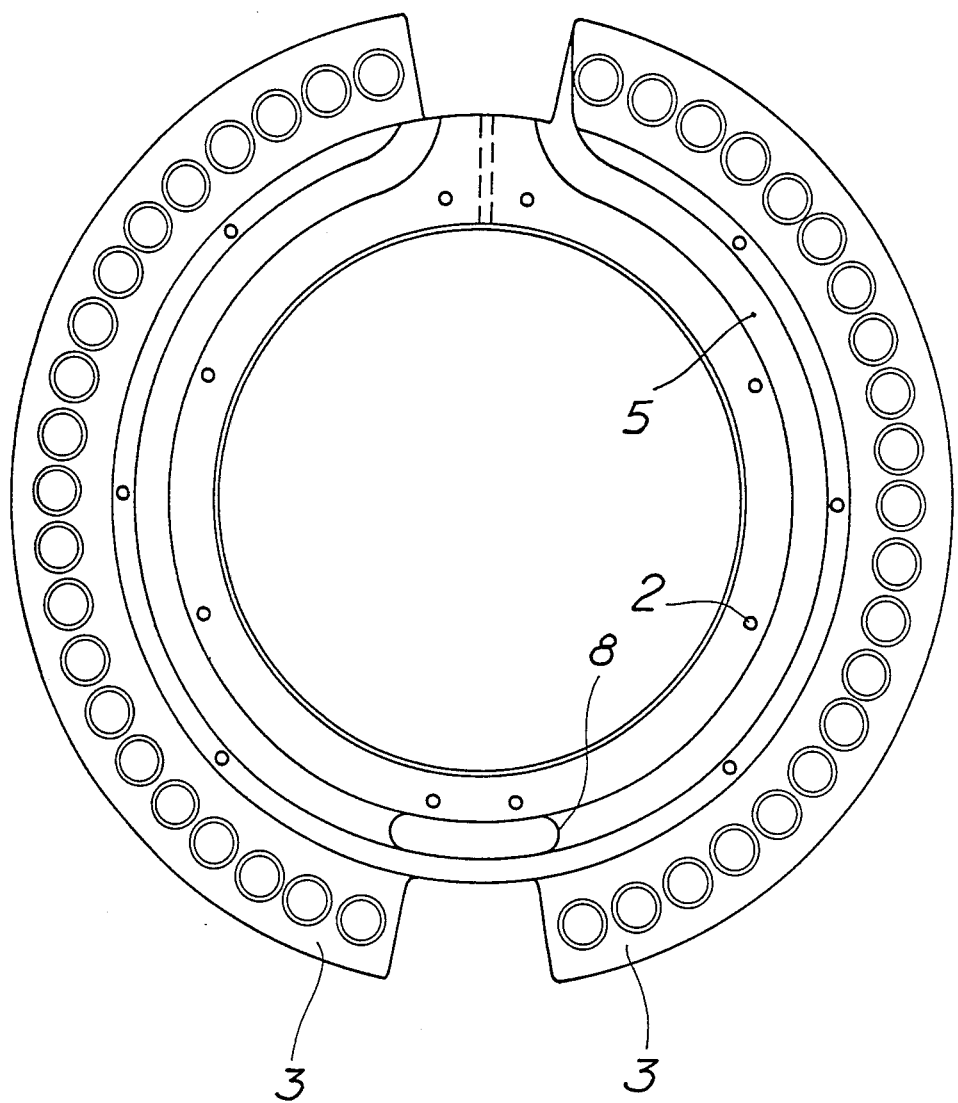
FIG. 4 schematically illustrates a making step of a modular element before the separation of the semicircular segments.

The segments, as is shown in FIG. 4, are made by cutting a single element so as to obtain two segments which may be arranged at a small distance, for providing, at one end thereof, the supplying and discharging air flow region, while, at the other end of the segments, there is formed the air flow reversing region which extends from the outer surface to the inner surface of the segments.

Moreover, the provision of the perforated fins is very important since, in addition to increasing the thermal exchange region, they provide a turbulence effect effective to further improve the thermal exchange.

While the invention has been disclosed with reference to preferred embodiments thereof, it should be apparent that it is susceptible to many modifications and variations all of which come within the scope and spirit of the invention itself.

I claim:

1. A modular element heat exchanger, particularly designed for plastics material extrusion cylinders, injection molding machines, drawing machines and the like machines for processing plastics material, comprising a plurality of semicylindrical segments coupled to one another for substantially providing a circular sleeve, to be applied about the body to be thermally controlled, said segments being provided along their outer periphery with radially extending fins including throughgoing openings and said segments being provided along their inner periphery with recesses, the two opposed lateral faces of said segments having recesses for housing an electric resistance, said heat exchanger further comprising a holding casing defining, in cooperation with said segments and the body to be thermally controlled, an air path extending successively on the outer periphery and inner periphery of said segments.

2. A heat exchanger according to claim 1, wherein said segments are provided with a plurality of throughgoing holes for engaging pins for axially stacking said segments.

3. A heat exchanger according to claim 1, wherein said radial fins have an outwardly tapering shape.

4. A heat exchanger according to claim 1, wherein said segments are provided, on their inner surfaces, with projecting regions alternating with recessed regions, said projecting regions forming the surface contacting the extrusion cylinder or the like, and said recessed regions providing the air path which extends parallely to the air inner path at said electric resistance.

5. A heat exchanger, according to claim 4, wherein said segments are arranged with said alternating projecting regions and recessed regions to provide a zig-zag path for the airflow.

6. A heat exchanger, according to claim 1, wherein said holding casing consists of an outer band enclosing said segments, and a conveying section member, defining a central channel communicating with the outer surface of said segments.

7. A heat exchanger, according to claim 1, wherein said segments are enclosed inside a holding casing which segments are separated from said holding casing by a thermally insulating layer.

8. A heat exchanger, according to claim 1, wherein said radial fins consist of a plurality of spaced fin portions, said fin portions being provided with a throughgoing opening.

* * * * *